US010028502B2

(12) United States Patent
Nichols

(10) Patent No.: US 10,028,502 B2
(45) Date of Patent: Jul. 24, 2018

(54) ANIMAL DETERRENT DEVICE

(71) Applicant: Richard Earl Nichols, Melbourne Village, FL (US)

(72) Inventor: Richard Earl Nichols, Melbourne Village, FL (US)

( * ) Notice: Subject to any disclaimer, the term of this patent is extended or adjusted under 35 U.S.C. 154(b) by 95 days.

(21) Appl. No.: 14/928,041

(22) Filed: Oct. 30, 2015

(65) Prior Publication Data

US 2016/0286785 A1 Oct. 6, 2016

Related U.S. Application Data

(60) Provisional application No. 62/140,699, filed on Mar. 31, 2015.

(51) Int. Cl.
| | |
|---|---|
| *A01M 29/10* | (2011.01) |
| *A01M 29/20* | (2011.01) |
| *A01M 29/24* | (2011.01) |
| *A01M 29/16* | (2011.01) |
| *A01M 29/12* | (2011.01) |
| *A01K 29/00* | (2006.01) |
| *A01M 31/00* | (2006.01) |

(52) U.S. Cl.
CPC ............ *A01M 29/24* (2013.01); *A01K 29/005* (2013.01); *A01M 29/10* (2013.01); *A01M 29/12* (2013.01); *A01M 29/16* (2013.01); *A01M 29/20* (2013.01); *A01M 31/002* (2013.01)

(58) Field of Classification Search
CPC ...... A01M 29/00; A01M 29/06; A01M 29/10; A01M 29/16; A01M 29/20; A01M 29/24

USPC ............................ 119/712, 719; 43/1; 52/101
See application file for complete search history.

(56) References Cited

U.S. PATENT DOCUMENTS

| | | | | |
|---|---|---|---|---|
| 5,432,756 A * | 7/1995 | Bryden | ...................... | C02F 1/36 367/139 |
| 5,894,818 A * | 4/1999 | Betzen | ................... | A01K 15/02 119/712 |
| 6,125,595 A * | 10/2000 | Showalter | .......... | A01K 39/0113 119/57.9 |
| 6,460,487 B1 * | 10/2002 | Betzen | ................... | A01M 29/06 119/712 |
| 7,044,085 B2 * | 5/2006 | Arnold | .................... | A01K 3/005 119/712 |
| 7,173,534 B1 * | 2/2007 | Markham | ........... | A01M 31/002 340/309.16 |
| 7,278,375 B2 * | 10/2007 | Ross | ...................... | A01K 15/02 116/22 A |

* cited by examiner

*Primary Examiner* — David J Parsley
(74) *Attorney, Agent, or Firm* — The Van Winkle Law Firm; William G. Heedy; David M. Carter

(57) ABSTRACT

An animal deterrent is provided. The animal deterrent includes a housing having a high voltage spark generator disposed within. A power source, such as a battery, is connected to the high voltage spark generator. A sensor may be connected to the battery and is operable to detect at least one of a motion and a sound. When the sensor detects at least one of the motion and the sound, the power source powers the high voltage spark generator so that the high voltage spark generator generates high voltage sparks. The high voltage sparks produce a sound and a light, along with ozone scaring animals away.

6 Claims, 2 Drawing Sheets

ANIMAL DETERRENT DEVICE

CROSS-REFERENCE TO RELATED APPLICATION

This application claims the benefit of priority of U.S. provisional application No. 62/140,699, filed Mar. 31, 2015, the contents of which are herein incorporated by reference.

BACKGROUND OF THE INVENTION

The present invention relates to an electronic device for discouraging animals from invading a protected area.

Many wild and domestic animals create billions of dollars in destruction of crops, flowers, trees, and other vegetation and can be a threat to children and pets. Electronic fences are expensive to install and maintain and can create hazards for children and pets.

Several approaches have been tried in detecting and deterring animals with a motion sensor and light or sound generator with very limited success. A determined animal trying to get to food is not easily discouraged.

As can be seen, there is a need for a device that can dramatically deter an animal from approaching a protected area.

SUMMARY OF THE INVENTION

In one aspect of the present invention, an animal deterrent comprises: a housing; a high voltage spark generator disposed within the housing; a power source operable to power the high voltage spark generator; a sensor operable to detect at least one of a motion and a sound, wherein when the sensor detects at least one of the motion and the sound, the power source powers the high voltage spark generator so that the high voltage spark generator generates high voltage sparks.

In another aspect of the present invention, a method of deterring animals from entering a restricted area comprises: placing an animal deterrent within the restricted area, wherein the animal deterrent comprises a high voltage spark generator; a power source operable to power the high voltage spark generator; and a sensor; detecting at least one of a sound and a motion within the restricted area by the sensor; producing a high voltage spark from the high voltage spark generator.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes an animal deterrent device. Animals both wild and domestic can cause significant damage to property and people and there is currently no cost effective and easy way to deter them from entering into areas where they do not belong. This device utilizes a combination of technologies which can detect an animal's presence and automatically provide a loud and bright spark simulating lightning which most animals greatly fear.

Other deterrents are usually a light and/or sound which is not effective on large or determined animals such as bears, coyotes, large dogs, deer. The simulated lightning generator is very effective with these animals. The loud spark simulating lightning is very effective since most animals run and hide when they see or hear lightning. The high voltage spark also generates ozone which is produced by lightning as well. Animals have a high sensitivity to ozone and can sense storms coming from far away by the ozone generated.

The present invention creates a simulated lightning effect utilizing a high voltage crackle and light from a stun gun like device. Motion detection may be included and passive infrared detection (PIR sensor) may be included for detecting when an animal is in range of the protected area. Light sensing can be included during the daytime if only nighttime operation is in use. A pulse time may be provided for limiting the duration of the crackle. The electronics may only require a low amount of power and a solar charging panel may be added for autonomous operation in remote areas. Since the present invention may be small and low cost, as well as solar powered, many devices may be distributed around larger areas for maximum protection.

Figure 1:
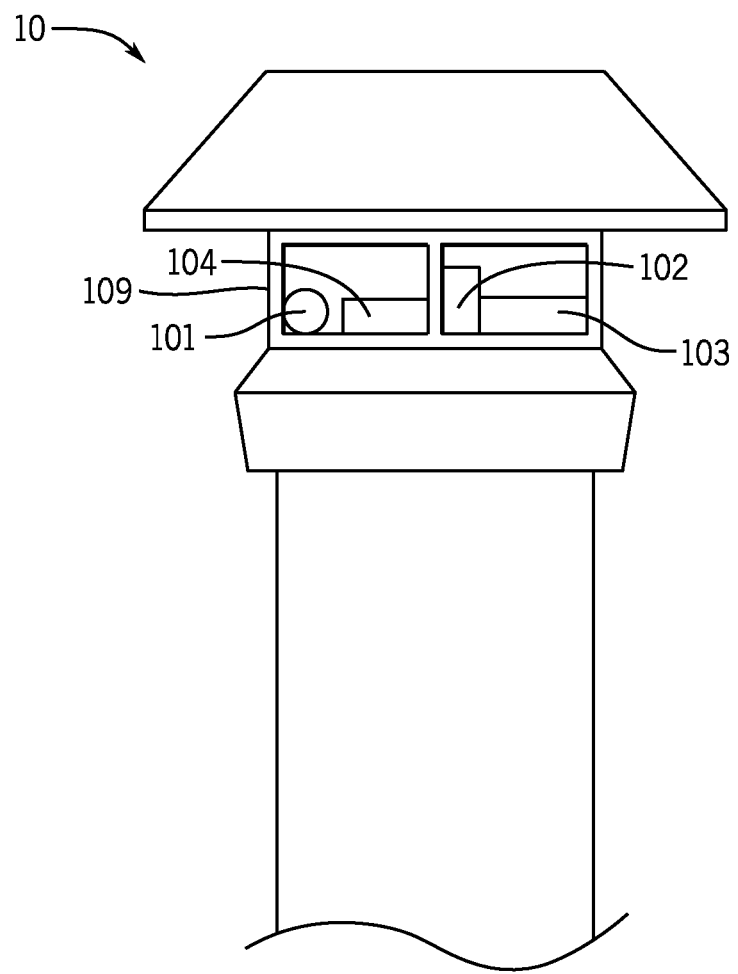
FIG. 1 is a front perspective view of an embodiment of the present invention.
Figure 2:
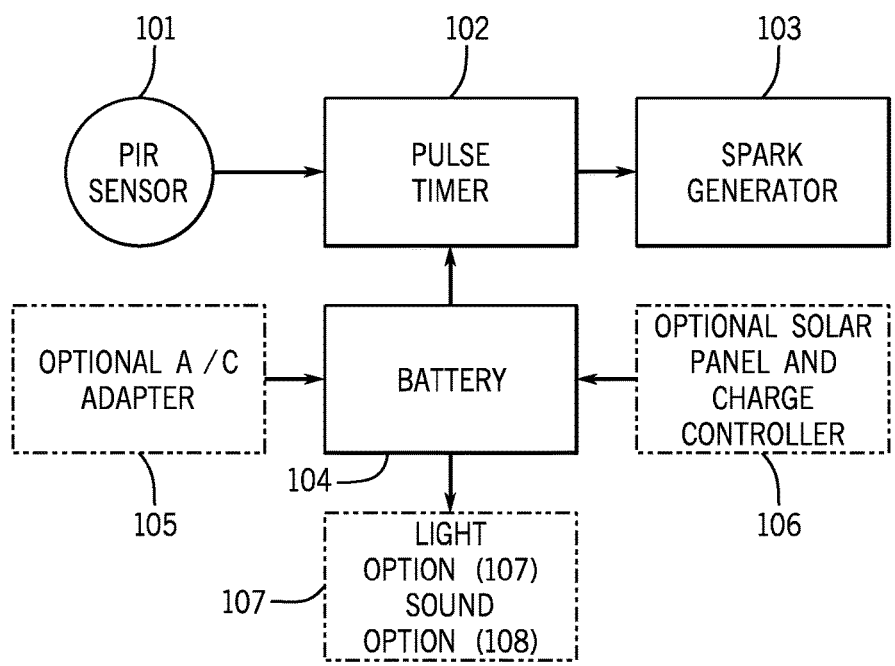
FIG. 2 is a block diagram of an embodiment of the present invention.

Referring to FIGS. 1 and 2, the present invention includes an animal deterrent 10. The animal deterrent 10 includes a housing 109 having a high voltage spark generator 103 disposed within. A power source, such as a battery 104, is connected to the high voltage spark generator 103. A sensor 101 may be connected to the battery 104 and is operable to detect at least one of a motion and a sound. When the sensor 101 detects at least one of the motion and the sound, the power source powers the high voltage spark generator 103 so that the high voltage spark generator 103 generates high voltage sparks. The high voltage sparks produce a sound and a light, scaring animals away.

The housing 109 may include a window leading into an internal cavity. The high voltage spark generator 103 may be disposed within the internal cavity such that the sound and the light produced by the high voltage spark generator 103 is heard and seen through the window. The housing 109 may include a protector around the spark generator 103 to protect against igniting fires. All of the components of the animal deterrent 10 may be housed within the internal cavity, forming a single unit. The housing 109 may be supported by a riser, which supports the animal deterrent 10 in an upright position.

As mentioned above, the sensor 101 may include a sensor 101 that detects motion, sound, or both. Several sensors 101 can be provided on a perimeter to protect a restricted area. In certain embodiments, the sensor 101 is a passive infrared detection sensor. A passive infrared detection sensor is an electronic sensor that measures infrared (IR) light radiating from objects in its field of view. Infrared radiation enters through the front of the sensor, known as the 'sensor face'. At the core of a PIR sensor is a solid state sensor or set of sensors, made from pyroelectric materials, materials which generate energy when exposed to heat. Typically, the sensors are approximately ¼ inch square (40 mm$^2$), and take the form of a thin film.

The present invention may further include a pulse timer 102. The pulse timer 102 may connect the battery 104 to the high voltage spark generator 103. A user may set a period of time on the pulse timer 102. When the sensor 101 detects at least one of the sound and the motion, the pulse timer 102 is operable to power the high voltage spark generator 103 for the set period of time. Once the set period of time expires, the power source no longer provides power to the high voltage spark generator 103 and the high voltage generator 103 is turned off.

As mentioned above, the power source of the present invention may include a battery 104. However, the present invention may not be limited to a battery 104, and may include power cables operable to connect with power outlets. In certain embodiments, the present invention may include an alternative current adapter 105 connected to the battery 104 and operable to charge the battery 104 when connected to an outlet. In certain embodiments, the present invention may utilize solar power. A solar panel 106 may be connected to the battery 104 and charge the battery 104 using solar power. The solar panel 106 can be provided for remote operation.

The high voltage spark generator 103 may include a device similar to that of a stun gun. The high voltage spark generator 103 may be based on either an oscillator, resonant circuit (a power inverter), and step-up transformer or a diode-capacitor voltage multiplier to achieve an alternating high-voltage discharge or a continuous direct-current discharge. The high voltage spark generator 103 generates a spark that produces a loud snapping sound and a bright light, simulating lightning. Animals are very scared of lightning. Therefore, the present invention is extremely effective in deterring animals from entering a restricted area.

In certain embodiments, the present invention may include additional deterrents to scare animals. For example, the present invention may include a light bulb 107, a speaker 108 or a combination thereof. The light bulb 107 may produce a bright light and the speaker 108 may produce a loud sound when the sensor 101 detects at least one of the sound and the motion.

Figure 3:
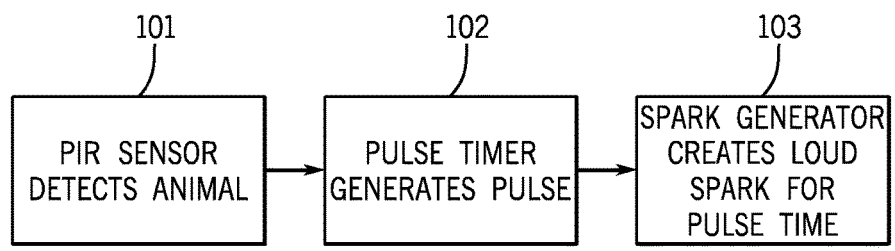
FIG. 3 is a flowchart of an embodiment of a method of the present invention.

Referring to FIG. 3, the present invention may further include a method of deterring animals from entering a restricted area. The method may include placing the animal deterrent 10 within a restricted area such that the sensor 101 is directed towards a target area. The animal deterrent 10 can be placed in one location or a plurality of animal deterrents 10 may be placed around a perimeter to protect the restricted area from invading animals. When the sensor 101 detects a sound or a motion within the target area, the high voltage spark generator 103 is powered and generates a loud spark. In certain embodiments, when the detector includes a pulse timer, a period of time is set. Therefore, when the sensor 101 detects a sound or a motion, the high voltage spark is produced from the high voltage spark generator 103 for the set period of time. As mentioned above, the high voltage spark generated is loud and produces a bright light, scaring animals away from the restricted area. Ozone is also produced by the spark which is also a deterrent to animals.

It should be understood, of course, that the foregoing relates to exemplary embodiments of the invention and that modifications may be made without departing from the spirit and scope of the invention as set forth in the following claims.

What is claimed is:

1. An animal deterrent for detecting and deterring an animal from entering a restricted area comprising:
a plurality of sensors;
a housing surrounding an internal cavity within which a high voltage spark generator, a power source, and at least one of said plurality of sensors are disposed, said housing including a window;
said high voltage spark generator operable to generate a simulated lightning, including a bright light and a loud sound for deterring animals within the restricted area, and an ozone odor for deterring animals from beyond the restricted area;
said power source operable to power said high voltage spark generator;
at least another of said plurality of sensors being positioned on a perimeter of the restricted area;
at least one of said plurality of sensors operable to detect at least one of a motion and a sound, wherein
when at least one of said plurality of sensors detects at least one of the motion and the sound, said power source powers said high voltage spark generator so that said high voltage spark generator generates the simulated lightning, and wherein the bright light is visible through the window of said housing.

2. The animal deterrent of claim 1, wherein at least one of said plurality of sensors is a passive infrared detection sensor.

3. The animal deterrent of claim 1, further comprising a pulse timer connecting said power source to said high voltage spark generator, wherein said pulse timer is operable to power said high voltage spark generator for a set period of time.

4. The animal deterrent of claim 1, further comprising an alternating current adapter through which said power source gets powered.

5. The animal deterrent of claim 1, further comprising at least one of a plurality of solar panels through which said power source gets powered.

6. The animal deterrent of claim 1, further comprising at least one of a light bulb and a speaker operable to produce at least one of the bright light and the loud sound when at least one of said plurality of sensors detects at least one of the sound and the motion.

* * * * *